United States Patent
Liao et al.

(10) Patent No.: US 10,833,995 B2
(45) Date of Patent: Nov. 10, 2020

(54) METHOD AND APPARATUS FOR DATACENTER CONGESTION CONTROL BASED ON SOFTWARE DEFINED NETWORK

(71) Applicant: Beijing University of Posts and Telecommunications, Beijing (CN)

(72) Inventors: Jianxin Liao, Beijing (CN); Qi Qi, Beijing (CN); Jing Wang, Beijing (CN); Jingyu Wang, Beijing (CN); Jiannan Bao, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 16/209,865

(22) Filed: Dec. 4, 2018

(65) Prior Publication Data
US 2019/0394129 A1    Dec. 26, 2019

(30) Foreign Application Priority Data

Jun. 20, 2018   (CN) .......................... 2018 1 0636431

(51) Int. Cl.
*H04L 12/801* (2013.01)
*H04L 29/08* (2006.01)
*H04L 29/06* (2006.01)

(52) U.S. Cl.
CPC ............ *H04L 47/12* (2013.01); *H04L 67/141* (2013.01); *H04L 67/143* (2013.01); *H04L 69/16* (2013.01)

(58) Field of Classification Search
CPC ......... H04L 47/10; H04L 47/27; H04L 69/16; H04L 67/143; H04L 47/2483; H04L 47/12; H04L 67/14
See application file for complete search history.

(56) References Cited

U.S. PATENT DOCUMENTS

| 2010/0054123 A1* | 3/2010 | Yong | H04L 43/0864 |
| | | | 370/230 |
| 2015/0365325 A1* | 12/2015 | Hwang | H04L 47/70 |
| | | | 370/230 |

FOREIGN PATENT DOCUMENTS

WO    WO-2016041341 A1 *   3/2016    ............. H04L 41/00

* cited by examiner

*Primary Examiner* — Ian N Moore
*Assistant Examiner* — Sun Jong Kim
(74) *Attorney, Agent, or Firm* — Umberg Zipser LLP (57) ABSTRACT

Embodiments of the present invention provide a congestion control method and apparatus based on a software defined network SDN, and an SDN controller. The method comprises: obtaining a packet_in message sent by a switch; determining a data packet included in the packet_in message; performing a first congestion control processing for a network where the SDN controller is located based on a topological structure and link information of the network when the data packet is a handshake information SYN packet for requesting to establish a TCP connection; performing a second congestion control processing for the network based on the link information when the data packet is a finish information FIN packet for responding to disconnection of a TCP connection; deleting information of a TCP connection stored in a database and corresponding to the data packet when the data packet is an FIN packet requesting to disconnect a TCP connection. As compared with the prior art, by using the solutions according to the embodiments of the present invention, the SDN controller may improve fairness of the bandwidth between each data flow, and reduce TCP retransmission and timeout caused by the highly burst short traffic, and achieve the control of the TCP Incast congestion existing in the datacenter.

11 Claims, 3 Drawing Sheets

METHOD AND APPARATUS FOR DATACENTER CONGESTION CONTROL BASED ON SOFTWARE DEFINED NETWORK

CROSS-REFERENCE TO RELATED APPLICATION

The present application claims the priority to a Chinese Patent Application No. 201810636431.5, filed with the China National Intellectual Property Administration (CNIPA) on Jun. 20, 2018 and entitled "METHOD AND APPARATUS FOR DATACENTER CONGESTION CONTROL BASED ON SOFTWARE DEFINED NETWORK", which is incorporated herein by reference in its entirety.

TECHNICAL FIELD

The present invention relates to the field of information technology, and particularly to a method and apparatus for datacenter congestion control based on a software defined network SDN and an SDN controller.

BACKGROUND

With the continuous development of information technology, datacenter has already become a cornerstone of information infrastructure, and provides a highly-integrated bandwidth for large-scale network service. The so-called datacenter refers to a whole set of complicated facilities which include not only a computer system and other devices matched therewith, for example, a communication system and a storage system, but also a redundant data communication connection device, an environment control device, a monitoring device and various safety devices. The datacenter may transfer, accelerate, display, compute and store data information on the Internet network infrastructure.

A congestion phenomenon appearing in the datacenter needs to be controlled to ensure normal operation of the datacenter. The so-called congestion phenomenon means a phenomenon that the number of packets reaching a certain portion in a communication sub-network is so excessive that this portion of network cannot process packets in time, thereby causing the degradation in performance of this portion or even of the whole network, and in the severe cases, causing standstill of network communication services.

Currently, TCP Incast congestion has already become a problem to be solved urgently in the datacenter. A main reason causing the TCP Incast congestion is: some MapReduce-like applications activate highly burst short traffic within a period of time; since short traffic is subjected to rigid time limitation, such highly burst short traffic causes TCP retransmission and timeout. Therefore, it is currently desirable to provide a datacenter congestion control method to solve the problem of TCP Incast congestion.

SUMMARY

Embodiments of the present invention are aimed to provide a method and apparatus for datacenter congestion control based on a software defined network SDN, and an SDN controller, to implement the control of the datacenter TCP Incast congestion.

Specific technical solutions are as follows.

In a first aspect, an embodiment of the present invention provides a congestion control method based on a software defined network SDN, applied to an SDN controller, the method comprising:

obtaining a packet_in message sent by a switch;

determining a data packet included in the packet_in message;

performing a first congestion control processing for a network where the SDN controller is located based on a topological structure and link information of the network when the data packet is a handshake information SYN packet for requesting to establish a TCP connection;

performing a second congestion control processing for the network based on the link information when the data packet is a finish information FIN packet for responding to disconnection of a TCP connection;

deleting information of a TCP connection stored in a database and corresponding to the data packet when the data packet is a FIN packet requesting to disconnect a TCP connection, wherein the database is used to store information of each TCP connection.

As an implementation of the embodiment of the present invention, performing a first congestion control processing for a network where the SDN controller is located based on a topological structure and link information of the network when the data packet is a handshake information SYN packet for requesting to establish a TCP connection, comprises:

extracting information of both communication parties from the SYN packet, wherein the information of the both communication parties includes: the IP address of a sender, the port address of the sender, the IP address of a receiver and the port address of the receiver;

determining path information of data flows between the sender and the receiver based on the topological structure and target information, wherein the target information includes: the ID of the switch, the input port number of the switch and information of the both communication parties;

storing the target information and the path information of the data flows into the database;

allocating bandwidth for each of the data flows based on the link information and the path information of each of the data flows currently stored in the database;

calculating a target window value of a receiving window for each of the data flows based on the bandwidth allocated for each of the data flows;

for each of the data flows, generating a target flow table for the data flow, and forwarding the target flow table to a target switch corresponding to the data flow, wherein a target flow table for any data flow is used to update the size of the receiving window of the data flow to the calculated target window value for the data flow.

As an implementation of the embodiment of the present invention, performing a second congestion control processing for the network based on the link information when the data packet is an FIN packet for responding to disconnection of a TCP connection, comprises:

allocating bandwidth for each of the data flows based on the link information and path information of each of the data flows currently stored in the database;

calculating a target window value of a receiving window for each of the data flows based on the bandwidth allocated for each of the data flows;

for each of the data flows, generating a target flow table for the data flow, and forwarding the target flow table to a target switch corresponding to the data flow, wherein a target flow table for any data flow is used to update the size of the receiving window of the data flow to the calculated target window value for the data flow.

As an implementation of the embodiment of the present invention, allocating bandwidth for each of the data flows based on the link information and path information of each of the data flows currently stored in the database, comprises:

obtaining target link information of each target link in the topological structure through statistics based on the link information and the path information of each of the data flows, wherein the target link is a link comprising a data flow having not been allocated with bandwidth, and the target link information of any target link includes: an available bandwidth of the target link and the number of data flows flowing through the target link and having not been allocated with bandwidth;

determining among the target links, the most congested target link as a to-be-allocated link based on the target link information of each target link;

allocating available bandwidth of the to-be-allocated link for a to-be-allocated data flow of the to-be-allocated link, wherein the to-be-allocated data flow is a data flow flowing through the to-be-allocated link and having not been allocated with bandwidth;

updating link information of a link through which the to-be-allocated data flow flows, and returning to the step of obtaining target link information of each target link in the topological structure through statistics based on the link information and the path information of each of the data flows, until there is no target link in the topological structure.

As an implementation of the embodiment of the present invention, determining among the target links, the most congested target link as a to-be-allocated link based on the target link information of each target link, comprises:

for each target link, calculating a ratio of the available bandwidth of the target link to the number of data flows flowing through the target link and having not been allocated with bandwidth as a link congestion degree;

determining a target link with the minimum link congestion degree as a to-be-allocated link.

As an implementation of the embodiment of the present invention, calculating a target window value of a receiving window for each of the data flows comprises:

calculating the target window value of a receiving window for each of the data flows with the following formula:

$$\min \sum_{i \in F_{bottle}} rwnd_i / num_i^{bottleneck}$$

$$\text{s.t.} \sum_{i \in F_{bottle}} rwnd_i / num_i^{bottleneck} \geq window_{base}$$

$$\frac{rwnd_i}{b_i \times num_i^{bottleneck}} = \text{latency}, \forall i < m$$

$$rwnd_i \geq 2, \forall i < m$$

$$rwnd_i = b_i \times num_i^{bottleneck} \times \text{latency}$$

wherein $F_{bottle}$ represents a set of data flows flowing through a bottleneck link in a direction, the bottleneck link is a link whose bandwidth capacity is completely allocated in one direction or two directions, i represents a serial number of a data flow in a set $F_{bottle}$, $rwnd_i$ represents a target window value of the data flow numbered i, $num_i^{bottleneck}$ represents the number of bottleneck links through which the data flow numbered i flows, $window_{base}$ represents the size of a basic window that can satisfy the bandwidth capacity of the link, $b_i$ represents bandwidth allocated for the data flow numbered i, latency represents a latency of the bottleneck link, and m represents the number of data flows in the set $F_{bottle}$.

As an implementation of the embodiment of the present invention, the target switch is a network edge switch;

the target flow table is a two-level flow table, wherein the first level is used to update the size of the receiving window of the data flow to the calculated target window value for the data flow, and the second level is used for routing.

In a second aspect, an embodiment of the present invention provide a congestion control apparatus based on a software defined network SDN which is applicable to an SDN controller, the apparatus comprising:

a message obtaining module configured to obtain a packet_in message sent by a switch;

a message determining module configured to determine a data packet included in the packet_in message, trigger a first control module when the data packet is a handshake information SYN packet for requesting to establish a TCP connection, trigger a second control module when the data packet is a finish information FIN packet for responding to disconnection of a TCP connection, and trigger a third control module when the data packet is an FIN packet for requesting to disconnect a TCP connection;

the first control module is configured to perform a first congestion control processing for a network where the SDN controller is located based on a topological structure and link information of the network;

the second control module is configured to perform a second congestion control processing for the network based on the link information;

the third control module is configured to delete information of a TCP connection stored in a database and corresponding to the data packet, wherein the database is used to store information of each TCP connection.

As an implementation of the embodiment of the present invention, the first control module comprises:

an information obtaining sub-module configured to extract information of both communication parties from the SYN packet, wherein the information of the both communication parties includes: the IP address of a sender, the port address of the sender, the IP address of a receiver and the port address of the receiver;

an information determining sub-module configured to determine path information of data flows between the sender and the receiver based on the topological structure and target information, wherein the target information includes: the ID of the switch, the input port number of the switch and information of the both communication parties;

an information storing sub-module configured to store the target information and the path information of the data flow into the database;

a bandwidth allocating sub-module configured to allocate bandwidth for each data flow based on the link information and the path information of each of the data flows currently stored in the database;

a window value calculating sub-module configured to calculate a target window value of a receiving window for each of the data flows based on the bandwidth allocated for each of the data flows;

a flow table generating sub-module configured to, for each of the data flows, generate a target flow table for the data flow, and forward the target flow table to a target switch corresponding to the data flow, wherein a target flow table for any data flow is used to update the size of the receiving window of the data flow to the calculated target window value for the data flow.

As an implementation of the embodiment of the present invention, the second control module comprises:

a bandwidth allocating sub-module configured to allocate bandwidth for each of the data flows based on the link information and path information of each of the data flows currently stored in the database;

a window value calculating sub-module configured to calculate a target window value of a receiving window for each of the data flows based on the bandwidth allocated for each of the data flows;

a flow table generating sub-module configured to, for each of the data flows, generate a target flow table for the data flow, and forward the target flow table to a target switch corresponding to the data flow, wherein a target flow table for any data flow is used to update the size of the receiving window of the data flow to the calculated target window value for the data flow.

As an implementation of the embodiment of the present invention, the bandwidth allocating sub-module comprises:

an information statistics unit configured to obtain target link information of each target link in the topological structure through statistics based on the link information and the path information of each of the data flows, wherein the target link is a link of a data flow having not been allocated with bandwidth, and the target link information of any target link includes: an available bandwidth of the target link and the number of data flows flowing through the target link and having not been allocated with bandwidth;

a link determining unit configured to determine among the target links, the most congested target link as a to-be-allocated link based on the target link information of each target link;

a bandwidth allocating unit configured to allocate an available bandwidth of the to-be-allocated link for a to-be-allocated data flow of the to-be-allocated link, wherein the to-be-allocated data flow is a data flow flowing through the to-be-allocated link and having not been allocated with bandwidth;

an information updating unit configured to update link information of a link through which the to-be-allocated data flow flows, return to the information statistics unit until there is no target link in the topological structure.

As an implementation of the embodiment of the present invention, the link determining unit comprises:

a congestion degree calculating subunit configured to, for each target link, calculate a ratio of the available bandwidth of the target link to the number of data flows flowing through the target link and having not been allocated with bandwidth as a link congestion degree;

a link determining subunit configured to determine a target link with the minimum link congestion degree as a to-be-allocated link.

As an implementation of the embodiment of the present invention, the window value calculating sub-module is specifically configured to:

calculate the target window value of the receiving window for each of the data flows with the following formula:

$$\min \sum_{i \in F_{bottle}} rwnd_i / num_i^{bottleneck}$$

-continued
$$\text{s.t.} \sum_{i \in F_{bottle}} rwnd_i / num_i^{bottleneck} \geq window_{base}$$

$$\frac{rwnd_i}{b_i \times num_i^{bottleneck}} = \text{latency}, \forall i < m$$

$$rwnd_i \geq 2, \forall i < m$$

$$rwnd_i = b_i \times num_i^{bottleneck} \times \text{latency}$$

wherein $F_{bottle}$ represents a set of data flows flowing through a bottleneck link in a direction, the bottleneck link is a link whose bandwidth capacity is completely allocated in one direction or two directions, i represents a serial number of a data flow in a set $F_{bottle}$, $rwnd_i$ represents a target window value of the data flow numbered i, $num_i^{bottleneck}$ represents the number of bottleneck links through which the data flow numbered i flows, $window_{base}$ represents the size of a basic window that can satisfy the bandwidth capacity of the link, $b_i$ represents bandwidth allocated for the data flow numbered i, latency represents a latency of the bottleneck link, and m represents the number of data flows in the set $F_{bottle}$.

As an implementation of the embodiment of the present invention, the target switch is a network edge switch; the above target flow table is a two-level flow table, wherein the first level is used to update the size of the receiving window of the data flow to the calculated target window value for the data flow, and the second level is used for routing.

In a third aspect, an embodiment of the present invention provides an SDN controller, comprising a processor, a communication interface, a memory and a communication bus, wherein the processor, the communication interface and the memory complete intercommunication through the communication bus;

the memory is configured to store a computer program;

the processor is configured to, upon executing the program stored on the memory, perform any of the steps of the congestion control method based on a software defined network SDN according to the first aspect.

In a fourth aspect, an embodiment of the present invention provides a computer readable storage medium which stores a computer program therein, the computer program is configured to, when being executed by the processor, perform any of the steps of the congestion control method based on a software defined network SDN according to the first aspect.

As can be seen from the above, in the solution provided by the embodiment of the present invention, after obtaining the packet_in message sent by the switch, the SDN controller employs different congestion control policies according to different data packets included in the packet_in message. In this way, upon adding a newly-established TCP connection or disconnecting an already-established TCP connection in the network, the SDN controller may quickly respond to changes of TCP connections in the network, and re-allocate bandwidth for the data flow in the existing TCP connections. Then, the SDN controller may improve fairness of the bandwidth between each data flow, and reduce TCP retransmission and timeout caused by the highly burden short traffic, to achieve the control of the TCP Incast congestion existing in the datacenter. In addition, since the SDN network may provide an open programming interface, the solution provided by the embodiment of the present invention does not need to amend the TCP protocol stack, and can be implemented more easily.

BRIEF DESCRIPTION OF THE DRAWINGS

In order to more clearly describe the embodiments of the present application and the technical solutions in the prior art, drawings that need to be used in the embodiments and the prior art will be briefly described below. Obviously, the drawings provided below are for only some embodiments of the present application; those skilled in the art can also obtain other drawings based on these drawings without any creative efforts.

DETAILED DESCRIPTION

The technical solutions of the present invention will be described clearly and completely by referring to the appended drawings in the embodiments of the present invention. Obviously, the described embodiments are only some, and not all, of the embodiments of the present application. All other embodiments obtained based on the embodiments of the present invention by those skilled in the art without any creative efforts fall into the scope of protection defined by the present invention.

Currently, TCP Incast congestion has already become a problem to be urgently solved in the datacenter. A main reason causing the TCP Incast congestion is: some MapReduce-like applications activate highly burst short traffic within a period of time; since short traffic is subjected to rigid time limitation, such highly burst short traffic causes TCP retransmission and timeout. Therefore, it is currently desirable to provide a datacenter congestion control method to solve the problem of TCP Incast congestion.

To solve the problem existing in the prior art, embodiments of the present invention provide a congestion control method and congestion control apparatus based on a software defined network SDN, and an SDN controller.

To facilitate understanding solutions of embodiments of the present invention, the SDN is first described below briefly.

SDN (Software Defined Network) is novel network architecture, and aims to separate a control plane from a forwarding plane of a network, virtualize a bottom-layer network, and achieve programmable control.

Figure 1:
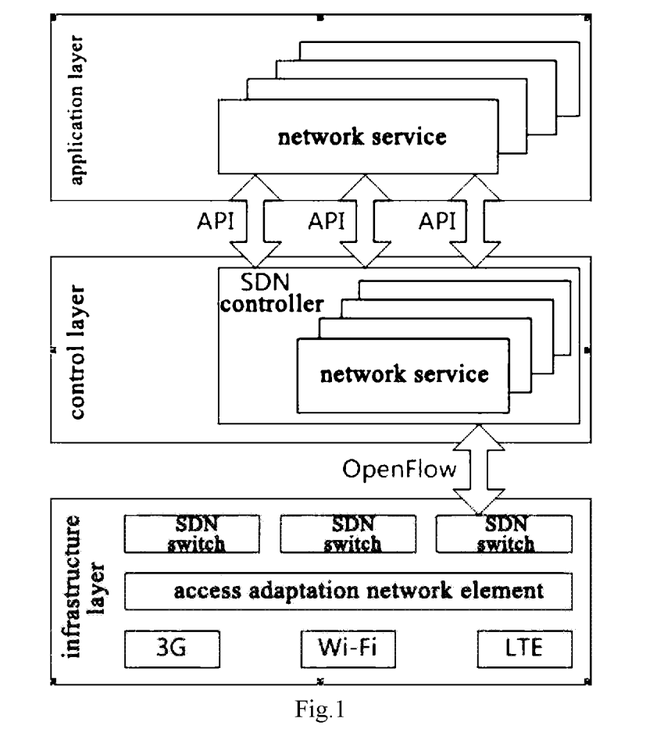
FIG. 1 is a structural schematic diagram of an SDN.

FIG. 1 shows a structural schematic diagram of an SDN, which includes a three-layer architecture comprising an application layer, a control layer and an infrastructure layer.

The infrastructure layer comprises network devices such as a switch, a router and an access adaptation network element, and each network device can provide network traffic.

The control layer consists of an SDN controller, which is a kernel component of the SDN and takes an important task of controlling the network traffic. The SDN controller may, based on a whole network measurability of SDN, obtain network-related information of the network where it is located such as a topological structure, link information and data flow path information, thereby activating or deactivating the forwarding of the traffic. As the core of the whole SDN, the SDN controller may provide centralized control and open a programming interface by decoupling a control plane and a data plane.

The application layer comprises one or more applications, each application has a right to exclusively occupy a group of resources, and these resources are provided by one or more SDN controllers in the control layer.

In the following, a congestion control method based on a software defined network SDN according to an embodiment of the present invention is first introduced.

Figure 2:
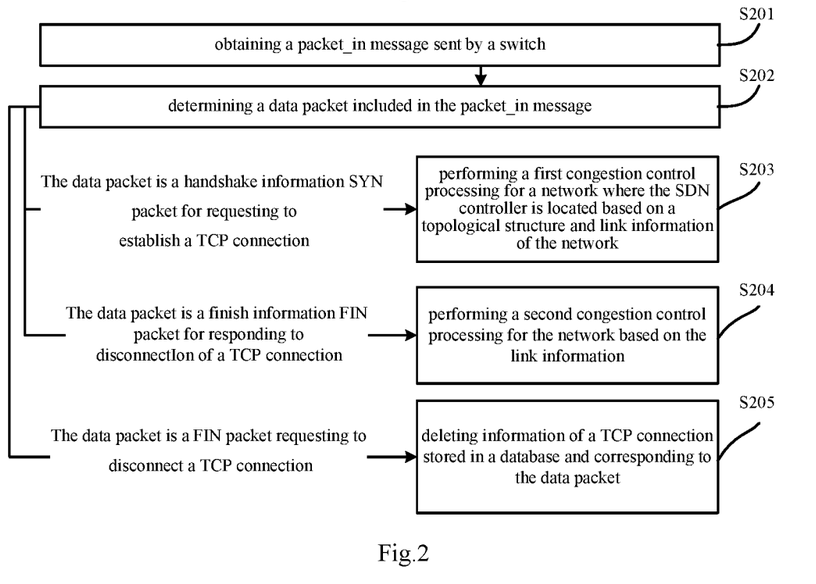
FIG. 2 is a flow chart of a congestion control method based on a software defined network SDN according to an embodiment of the present invention.

FIG. 2 is a flow chart of a congestion control method based on a software defined network SDN according to an embodiment of the present invention. As shown in FIG. 2, the congestion control method based on a software defined network SDN provided by the embodiment of the present invention may comprise the following steps:

S201: obtaining a packet_in message sent by a switch;

wherein the packet_in message is a message generated by the switch and sent to the SDN controller. The message may include many types of data packets, for example, a data packet for bandwidth detection, a data packet for topological information update, and data packets of other non-TCP protocols.

In the above step S201, a manner in which the SDN controller obtains the packet_in message may be that the switch, after generating the packet_in message, sends the packet_in message to the SDN controller, or that the SDN controller sends a message obtainment request to the switch, and receives the packet_in message sent by the switch to the SDN controller in response to the message obtainment request.

S202: determining a data packet included in the packet_in message.

Since the packet_in message may include many types of data packets and some data packets may not include information needed by the SDN controller to perform congestion control processing, thus these data packets may not be related to the congestion control processing performed by the SDN controller. Therefore, the SDN controller, after obtaining the packet_in, may determine the data packets included in the packet_in message, and then determine, based on the result, whether to adopt congestion control processing or what type of congestion control processing is adopted.

S203: performing a first congestion control processing for a network where the SDN controller is located based on a topological structure and link information of the network when the data packet is a handshake information SYN packet for requesting to establish a TCP connection.

TCP (Transmission Control Protocol) is a connection-orientated, reliable and byte flow-based transport layer communication protocol. SYN (synchronous) is a handshake signal used for TCP/IP to establish a connection.

The topological structure of the network may characterize a connection between switches in the network. The link information of the network is bandwidth which is available to be allocated on a link between switches in the network. Since the SDN has a full-network measurability, the SDN controller may obtain the topological structure and link information of the network where it is located.

When the data packet included in the packet_in message is a handshake information SYN packet for requesting to establish a TCP connection, it indicates that the packet_in may instruct to add a newly-established TCP connection in the network. It may be appreciated that before establishing a new TCP connection, the SDN controller may allocate bandwidth for the data flows already existing in the network on a link through which these data flows flow, to ensure normal communications in the network. After a newly-established TCP connection is added in the network, according to path information of data flow on the newly-established TCP connection, the SDN controller needs to allocate bandwidth for the data flow on the newly-established TCP connection on a link through which it flows. That is to say, the original bandwidth allocation scheme in the network is not applicable; the SDN controller may establish a new bandwidth allocation scheme to avoid the congestion problem in the network.

Therefore, when the SDN controller determines in step S202 that the data packet included in the packet_in message is handshake information SYN packet for requesting to establish a TCP connection, the SDN controller may perform the first congestion control processing for the network where the SDN controller is located based on the topological structure and link information of the network. To make the description clear, step S203 will be illustrated subsequently.

It should be noted that in the embodiment of the present invention, the handshake information SYN packet for requesting to establish a TCP connection may be an SYN packet sent by a sender to a receiver and used for establishing a TCP connection, wherein the sender is a communication initiator, and the receiver is a communication responder.

S204: performing a second congestion control processing for the network based on link information when the data packet is a finish information FIN packet for responding to disconnection of a TCP connection.

FIN (finish) is a finish signal for characterizing completion of data transmission. The link information is the same as the above step S203 and will not be detailed any more.

When the data packet included in the packet_in message is the finish information FIN packet for responding to disconnection of a TCP connection, it indicates that the packet_in message may instruct to disconnect the TCP connection corresponding to the packet_in message in the network, the TCP connection being a currently already-established connection in the network. It may be appreciated that before disconnecting the TCP connection, the SDN controller may allocate bandwidth for data flows already existing in the network on a link through which these data flows flow, to ensure normal communications in the network. After the TCP connection corresponding to the packet_in message in the network is disconnected, data flows corresponding to the TCP connection disappear, and the bandwidth allocated for these data flows on the link through which these data flows flow may be released. That is to say, after the TCP connection is disconnected, there will be allocatable bandwidths on some links in the network, the SDN controller may allocate these allocatable bandwidths to data flows still existing in the network, so that these data flows still existing in the network may obtain more optimized bandwidth, and thus, there can be no congestion problem in the network.

Therefore, when the SDN controller determines in step S202 that the data packet included in the packet_in message is the finish information FIN packet for responding to disconnection of a TCP connection, the SDN controller may perform the second congestion control processing for the network based on the link information of the network where the SDN controller is located. To make the description clear, step S204 will be illustrated subsequently.

S205: deleting information of the TCP connection stored in a database and corresponding to the data packet when the data packet is a FIN packet requesting to disconnect the TCP connection.

The database is used to store information of respective TCP connections.

It may be appreciated that the database may store information of respective TCP connections existing in the network. Such information may include IP addresses and port addresses of both communication parties of each TCP connection, and path information of corresponding data flows. Certainly, the database may also store other information. This is not specifically limited in the embodiment of the present invention.

When the data packet included in the packet_in message is the FIN packet for requesting to disconnect a TCP connection, it indicates that the packet_in message may instruct to request to disconnect the TCP connection corresponding to the packet_in message in the network, the TCP connection being a currently already-established connection in the network. At this time, the TCP connection begins to disconnect, but has not completed the disconnection. That is to say, at this time, the network still has data flows corresponding to the TCP connection. After completing the disconnection of the TCP connection, this TCP connection is no longer existed in the network, and the data flows corresponding to the TCP connection also disappears. Therefore, the SDN controller may delete information of the TCP connection stored in the database and corresponding to the data packet.

For ease of description, a party of the both communication parties that wants to disconnect the TCP connection may be called the sender, and the other party called the receiver. It should be noted that when the sender sends to the receiver an FIN packet requesting to disconnect the TCP connection, the TCP connection begins to disconnect, and then when the receiver sends to the sender an FIN packet for responding to disconnection of a TCP connection, the disconnection of the TCP connection may be completed. That is to say, the disconnection process of the TCP connection may include two phases: the sender initiating the disconnection, and the receiver responding to the disconnection. When both two phases are completed, the disconnection of the TCP connection is completed.

Therefore, when the sender initiates the disconnection, i.e., when the data packet included in the packet_in message is the FIN packet for requesting to disconnect a TCP connection, bandwidth allocated for data flows corresponding to the TCP connection on the link through which these data flows flow is not yet released. The SDN controller may perform the above step S205 of deleting information of the TCP connection stored in a database and corresponding to the data packet.

When the receiver responds to disconnect, i.e., when the data packet included in the packet_in message is the finish information FIN packet for responding to disconnection of a TCP connection, the TCP disconnection is completed, the bandwidth allocated for data flows corresponding to the TCP connection on the link through which these data flows flow is released, the SDN controller may perform the above step S204 of performing the second congestion control processing for the network based on link information of the network where the SDN controller is located.

In the present embodiment of the present disclosure, in the above step S204, the finish information FIN packet for responding to disconnection of a TCP connection may be a finish information FIN packet sent by the receiver to the sender and used to respond to disconnect the TCP connection. In the above step S205, the FIN packet for requesting to disconnect a TCP connection may be a FIN packet sent by the sender to the receiver and used to request to disconnect the TCP connection.

As can be seen from the above, in the solution provided by the embodiment of the present invention, after obtaining the packet_in message sent by the switch, the SDN controller employs different congestion control policies according to different data packets included in the packet_in message. In this way, upon adding a newly-established TCP connection or disconnecting an already-established TCP connection in the network, the SDN controller may quickly respond to changes of the TCP connection in the network, and reallocate bandwidth for data flows in the existing TCP connection. Then, the SDN controller may improve fairness of the bandwidth between respective data flow, and reduce TCP retransmission and timeout caused by the highly burst short traffic, to achieve the control of the TCP Incast congestion existing in the datacenter. In addition, since the SDN network may provide an open programming interface, the solution provided by the embodiment of the present invention does not need to amend the TCP protocol stack, and can be implemented more easily.

Figure 3:
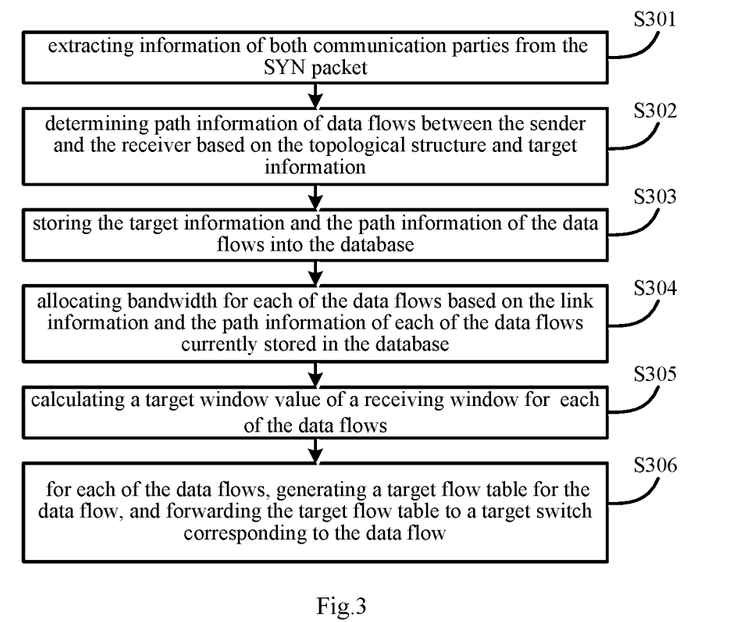
FIG. 3 is a flow chart of a specific implementation of step S203 in the embodiment shown in FIG. 2.

The above mentioned step S203 of performing a first congestion control processing for the network where the SDN controller is located based on the topological structure and link information of the network when the data packet is a SYN packet for requesting to establish a TCP connection, is illustrated below. As shown in FIG. 3, the above step S203 may include:

S301: extracting information of both communication parties in the SYN packet.

The information of the both communication parties includes: the IP address of the sender, the port address of the sender, the IP address of the receiver and the port address of the receiver.

When the data packet included in the packet_in message is a handshake information SYN packet for requesting to establish a TCP connection, it indicates that the packet_in may instruct to add a newly-established TCP connection in the network. Therefore, the SYN packet may include information related to both communication parties that want to establish the TCP connection, so that the network where the SDN controller is located may add a newly-established TCP connection in the network based on these information.

It may be appreciated that the information related to both communication parties may include the IP address of the sender, the port address of the sender, the IP address of the receiver and the port address of the receiver, so as to determine the both communication parties of the TCP connection according to the IP address of the sender and the IP address of the receiver, and meanwhile achieve the transfer of information flow between the sender and the receiver according to the port address of the sender and the port address of the receiver. Certainly, the SYN packet may include other information. This is not specifically limited in the embodiment of the present invention.

Hence, in order to complete adding a newly-established TCP connection in the network as instructed by the packet_in message and enable the SDN controller to allocate bandwidth for the data flow corresponding to the newly-established TCP connection, the SDN controller may extract information of both communication parties in the SYN packet upon determining that the data packet included in the packet_in message is a handshake information SYN packet for requesting to establish a TCP connection. The information of the both communication parties may include: the IP address of the sender, the port address of the sender, the IP address of the receiver and the port address of the receiver.

S302: determining path information of data flows between the sender and the receiver based on the topological structure and target information.

The target information includes: the ID of the switch, the input port number of the switch and information of both communication parties.

The above packet_in message is generated by the switch and sent to the SDN controller. Therefore, the packet_in message may include the ID of the switch and the input port number of the switch, so that after obtaining the packet_in message, the SDN controller can extract, from the packet_in message, the ID and the input port number of the switch that generates and sends this packet_in message, so that the SDN controller may determine which switch generates and sends this packet_in message, and from which port number of the switch the data packet included in the packet_in message enters the switch.

Certainly, the packet_in message may further include other information. This is not specifically limited by the embodiment of the present invention.

The SDN controller may obtain the topological structure of the network where it is located, and the topological structure may characterize the connection between switches in the network, that is to say, the SDN controller may acquire the switch port number for transmitting data flows between the switches in the network where it is located, namely, through which port of the current switch the data flow is transmitted to next switch, and through which port of the next switch the data flow is received. Therefore, based on the above topological structure, the ID of the switch, the port number of the switch and the information of both communication parties, the SDN controller may determine the path information of the data flow corresponding to the TCP connection newly established in the network based on the packet_in message.

The path information may be understood as a directed path from the sender to the receiver that is formed by directed links through which the data flow is transmitted from the sender to the receiver.

S303: storing the target information and the path information of the data flow into a database.

The database is used to store TCPs in the network.

After adding a newly-established TCP connection in the network, the TCP connections existing in the network are changed, and the SDN controller needs to allocate bandwidth for the data flow on the newly-established TCP connection on the link through which it flows, that is to say, the SDN controller may change the bandwidth allocation scheme before the newly-established TCP connection is added, and establish a new bandwidth allocation scheme. The SDN controller may establish a new bandwidth allocation scheme based on the information of the TCP connections stored in the database.

It may be appreciated that when the SDN controller is based on the information of the TCP connections stored in the database, the information of the TCP connections stored in the database needs to include the information of the newly-established TCP connection. Therefore, after determining the target information and the path information of the data flows between the sender and the receiver, the SDN controller may take such information as the information of the newly-established TCP connection, and store it in the database. That is to say, after a newly-established TCP connection is added in the network, the information of the TCP connections stored in the database can be updated to enable the database to store the information of the newly-established TCP connection, and then enable the new bandwidth allocation scheme established by the SDN controller to be applicable for the current network state.

S304: allocating bandwidth for each of the data flows based on the link information and the path information of each of the data flows currently stored in the database.

After updating the information of the TCP connections stored in the database, the SDN controller may allocate bandwidth for each of the data flows based on the link information of the network and the path information of each of the data flows currently stored in the database.

Optionally, in a specific implementation, the above step S304 may include:

Step A1: obtaining target link information of each target link in the topological structure through statistics based on the link information and the path information of each data flow.

The target link is a link of data flow for which bandwidth has not been allocated. The target link information of any target link includes: an available bandwidth of the target link and the number of data flows flowing through the target link and having not been allocated bandwidth.

After determining the path information of the each data flow and the link information of the network, the SDN controller may, according to the links through which each data flow flows in the transmission process, determine data flows flowing through each link in the network. These data flows may include some data flows for which bandwidth has not been allocated, for example, as for the data flow corresponding to the added newly-established TCP connection, the SDN controller has not yet allocated a link for it. For ease of description, a link having a data flow having not been allocated with bandwidth is briefly called the target link.

Therefore, after updating the information of the TCP connections stored in the database, the SDN controller may first obtain the target link information of each target link in the topological structure through statistics based on the link information and the path information of each data flow, wherein the target link information of any target link includes: an available bandwidth of the target link and the number of data flows flowing through the target link and having not been allocated with bandwidth. Certainly, the target link information may also include other information. This is not specifically limited by the embodiments of the present invention.

Step A2: determining among the target links, the most congested target link as a to-be-allocated link based on the target link information of each target link, wherein the most congested target link is a target link with the minimum link congestion degree.

After obtaining, through statistics, the target link information of the each target link in the topological structure of the network where the SDN controller is located, the SDN controller may, based on the link information of each target link obtained through statistics, determine among the target links, the most congested target link as a to-be-allocated link.

Optionally, in a specific implementation, the above step A2 may include:

Step B1: for each target link, calculating a ratio of the available bandwidth of the target link to the number of data flows flowing through the target link and having not been allocated with bandwidth as a link congestion degree.

Step B2: determining a target link with the minimum link congestion degree as a to-be-allocated link.

For each target link, the SDN controller may calculate a ratio of the available bandwidth of the target link to the number of data flows flowing through the target link and having not been allocated with bandwidth, and take the ratio as the link congestion degree of the link. A smaller ratio indicates that a smaller bandwidth on the link that may be allocated to each data flow having not been allocated with bandwidth. The bandwidth refers to data quantity that can pass through the link in a per unit time. Therefore, a smaller bandwidth allocated to the data flow indicates a shorter data quantity of the data flow that can pass through the link in a per unit time. It may be understood that in the case of the data flows with the same data quantity, if different bandwidths are allocated for different links, it takes a longer time for the data flow to flow through a link allocated with a small bandwidth, and then it may indicate that the congestion degree of this link is larger. Therefore, the SDN controller may take the target link obtained through calculation in above step B1 with the minimum link congestion degree as the to-be-allocated link.

Certainly, the SDN controller may determine the to-be-allocated link in other manners. This is not specifically limited by the embodiment of the present invention.

Step A3: allocating an available bandwidth of the to-be-allocated link for a to-be-allocated data flow of the to-be-allocated link, wherein the to-be-allocated data flow is a data flow flowing through the to-be-allocated link and having not been allocated with bandwidth.

For ease of description, the data flow flowing through the to-be-allocated link and having not been allocated with bandwidth is briefly called a to-be-allocated data flow. After determining the to-be-allocated link, the SDN controller may allocate an available bandwidth of the to-be-allocated link for a to-be-allocated data flow of the to-be-allocated link.

Optionally, in a specific implementation, the SDN controller may evenly allocate the available bandwidth of the to-be-allocated link to to-be-allocated data flows of the to-be-allocated link. That is, the bandwidth allocated to each to-be-allocated data flow of the to-be-allocated link may be a ratio of the available bandwidth of the to-be allocated link to the number of data flows flowing through the to-be-allocated link and having not been allocated with bandwidth, namely, the link congestion degree of the to-be-allocated link.

Certainly, the SDN controller may allocate the available bandwidth of the to-be-allocated link to to-be-allocated data flows of the to-be-allocated link in other manners. This is not specifically limited in the present application.

Step A4: updating link information of links through which the to-be-allocated data flows flow, returning to the step of obtaining target link information of each target link in the topological structure through statistics based on the link information and the path information of each of the data flows, until there is no target link in the topological structure.

In the network, the path information of different data flows may include the same links or different links. Hence, after the SDN controller performs the above step A3 of allocating bandwidth for data flows having not been allocated with bandwidth on the most congested target link, situations of data flows existing on the links in the network and having not been allocated with bandwidth may change, and the target link and its target link information in the network also vary therewith.

Therefore, after allocating the available bandwidth of the to-be-allocated link for the to-be-allocated data flow of the to-be-allocated link, the SDN controller may update the link information of the link through which the to-be-allocated data flow flows, and return to the above step A1, so that the SDN controller again obtains target link information of each target link in the topological structure through statistics based on the updated link information and path information of each data flow, and performs steps A2-A4 here, until there is no target link in the topological structure of the network. At this time, all links of the network where the SDN controller is located may not include data flows having not been allocated with bandwidth, that is to say, the SDN controller may allocate bandwidth for the data flows corresponding to all TCP connections in the network where it is located.

S305: calculating the target window value of a receiving window for each of the data flows based on the bandwidth allocated for each of the data flows.

After allocating bandwidth for data flows corresponding to all TCP connections in the network, the SDN controller may, based on the bandwidth allocated for each of the data flows, calculate the target window value of a receiving window for each of the data flows.

Optionally, in a specific implementation, the above step 305 may calculate the target window value of the receiving window for each of the data flows with the following formula:

$$\min \sum_{i \in F_{bottle}} rwnd_i / num_i^{bottleneck}$$

$$\text{s.t.} \sum_{i \in F_{bottle}} rwnd_i / num_i^{bottleneck} \geq window_{base}$$

$$\frac{rwnd_i}{b_i \times num_i^{bottleneck}} = \text{latency}, \forall i < m$$

$$rwnd_i \geq 2, \forall i < m$$

$$rwnd_i = b_i \times num_i^{bottleneck} \times \text{latency}$$

wherein $F_{bottle}$ represents a set of data flows flowing through a bottleneck link in a direction, the bottleneck link is a link whose bandwidth capacity is completely allocated in one direction or two directions, i represents a serial number of a data flow in a set $F_{bottle}$, $rwnd_i$ represents a target window value of the data flow numbered i, $num_i^{bottleneck}$ represents the number of bottleneck links through which the data flow numbered i flows, $window_{base}$ represents the size of a basic window that can satisfy the bandwidth capacity of the link, $b_i$ represents bandwidth allocated for the data flow numbered i, latency represents a latency of the bottleneck link, and m represents the number of data flows in the set $F_{bottle}$.

It should be noted that in the embodiment of the present invention, the link considered is a full-duplex bi-directional link. It may be appreciated that the link is a path on which the data flow is transmitted in the network, and it has two transmission directions. The so-called full-duplex bi-directional link refers to a link that allows the data flow to be transmitted bidirectionally simultaneously. Therefore, in the embodiment of the present invention, calculating the target window value of the receiving window for each of the data flows may be performed in two directions separately.

Certainly, the SDN controller may calculate the target window value of the receiving window for each of the data flows in other manners. This is not specifically limited in the present application.

S306: for each of the data flows, generating a target flow table for the data flow, and forwarding the target flow table to a target switch corresponding to the data flow.

The target flow table for any data flow is used to update the size of the receiving window of the data flow to the calculated target window value for the data flow.

After the target window value of the receiving window is calculated for each of the data flows, the SDN controller may, for each of the data flows, generate the target flow table for the data flow, and forward the data flow table to the target switch corresponding to the data flow.

The target flow table may include the calculated target window value for the data flow so that the target flow table may be used to modify the size of the receiving window of the data flow, such that the size of the receiving window of the data flow may be updated to the calculated target window value for the data flow.

Optionally, in a specific implementation, the SDN controller may send the generated target flow table for the data flow to the target switch corresponding to the data flow by a Modify Flow Entry message.

Optionally, in a specific implementation, modifying the size of the receiving window of the data flow to allow it to be updated to the calculated target window value for the data flow may be implemented in a way that the target switch modifies the receiving window fields in an ACK (Acknowledgement) data packet.

Optionally, in a specific implementation, the target switch is a network edge switch; the above target flow table is a two-level flow table, wherein the first level is used to update the size of the receiving window of the data flow to the calculated target window value for the data flow, and the second level is used for routing.

Figure 4:
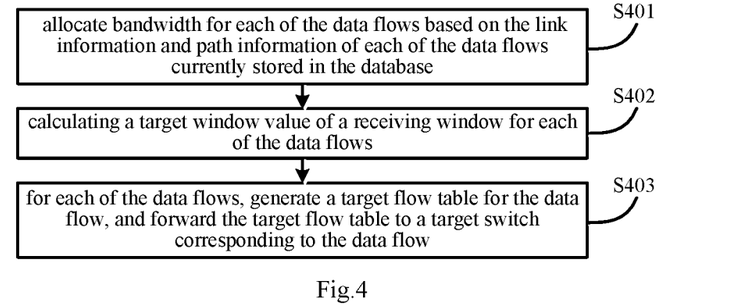
FIG. 4 is a flow chart of a specific implementation of step S204 in the embodiment shown in FIG. 2.

The above-mentioned step S204: performing a second congestion control processing for the network based on link information when the data packet is the FIN packet for responding to disconnection of a TCP connection is illustrated below. As shown in FIG. 4, specifically, the above step S204 may include:

S401: allocating bandwidth for each of the data flows based on the link information and path information of each of the data flows currently stored in the database.

According to the above illustrations of step S204 and step S205, it may be appreciated that when the SDN controller determines that the data packet included in the packet_in message is an FIN packet for responding to disconnection of a TCP connection, it indicates that the switch, before generating this packet_in message, already generates another packet_in message corresponding to this packet_in message, and the another packet_in message includes an FIN packet requesting to disconnect the TCP connection which corresponds to the FIN packet for responding to disconnection of a TCP connection.

Then, the SDN controller, before performing the above step S204, may already delete the information of the TCP connection stored in the database and corresponding to the FIN packet for responding to disconnection of a TCP connection. Therefore, it is feasible to update the path information of each of the data flows stored in the database in the above step S401, so that the path information of each of the data flows included in the database is the path information of each of the data flows still existing in the network, after the TCP connection corresponding to the FIN packet for responding to disconnection of a TCP connection is disconnected. That is to say, the path information of each of the data flows stored in the database in the step S401 may not include the path information of the data flow of the TCP connection corresponding to the FIN packet for responding to disconnection of a TCP connection.

S402: calculating the target window value of a receiving window for each of the data flows based on the bandwidth allocated for each of the data flows.

S403: for each of the data flows, generating a target flow table for the data flow, and forwarding the target flow table to a target switch corresponding to the data flow, wherein a target flow table for any data flow is used to update the size of the receiving window of the data flow to the calculated target window value for the data flow.

It should be noted that the above steps S401-S403 are the same as steps S304-S306 in the embodiment shown in FIG. 3, and will not be detailed any longer.

Corresponding to the congestion control method based on a software defined network SDN according to the embodiment of the present invention, an embodiment of the present invention further provides a congestion control apparatus based on a software defined network SDN.

Figure 5:
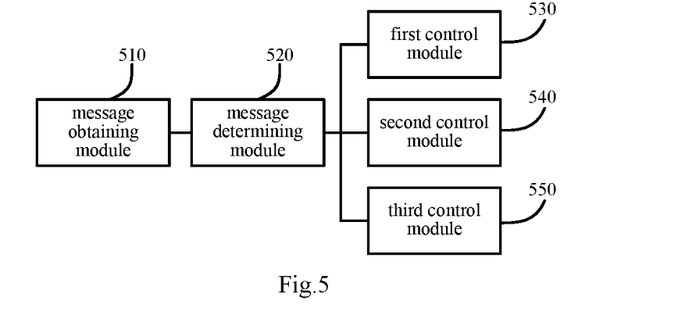
FIG. 5 is a structural schematic diagram of a congestion control apparatus based on a software defined network SDN according to an embodiment of the present invention.

FIG. 5 shows a congestion control apparatus based on a software defined network SDN according to an embodiment of the present invention. As shown in FIG. 5, the congestion control apparatus based on a software defined network SDN according to the embodiment of the present invention may comprise the following modules:

a message obtaining module 510 configured to obtain a packet_in message sent by a switch;

a message determining module 520 configured to determine a data packet included in the packet_in message, trigger a first control module 530 when the data packet is a handshake information SYN packet for requesting to establish a TCP connection, trigger a second control module 540 when the data packet is a finish information FIN packet for responding to disconnection of a TCP connection, and trigger a third control module 550 when the data packet is an FIN packet for requesting to disconnect a TCP connection;

the first control module 530 is configured to perform a first congestion control processing for a network based on a topological structure and link information of the network where the SDN controller is located;

the second control module 540 is configured to perform a second congestion control processing for the network based on the link information;

the third control module 550 is configured to delete information of a TCP connection stored in a database and corresponding to the data packet, wherein the database is used to store information of each TCP connection.

As can be seen from the above, in the solution provided by the embodiment of the present invention, after obtaining the packet_in message sent by the switch, the SDN controller employs different congestion control policies according to different data packets included in the packet_in message. In this way, upon adding a newly-established TCP connection or disconnecting an already-established TCP connection in the network, the SDN controller may quickly respond to changes of TCP connections in the network, and re-allocate bandwidth for data flows in the existing TCP connections. Then, the SDN controller may improve fairness of the bandwidth between each data flow, and reduce TCP retransmission and timeout caused by the highly burst short traffic, to achieve the control of the TCP Incast congestion existing in the datacenter. In addition, since the SDN network may provide an open programming interface, the solution provided by the embodiment of the present invention does not need to amend the TCP protocol stack, and can be implemented more easily.

As an implementation of the embodiment of the present invention, the first control module 530 may include:

an information obtaining sub-module (not shown in FIG. 5) configured to extract information of both communication parties in the SYN packet, wherein the information of the both communication parties includes: the IP address of a sender, the port address of the sender, the IP address of a receiver and the port address of the receiver;

an information determining sub-module (not shown in FIG. 5) configured to determine path information of data flows between the sender and the receiver based on the topological structure and target information, wherein the target information includes: the ID of the switch, the input port number of the switch and information of both communication parties;

an information storing sub-module (not shown in FIG. 5) configured to store the target information and the path information of the data flows into the database;

a bandwidth allocating sub-module (not shown in FIG. 5) configured to allocate bandwidth for each of the data flows, based on the link information and the path information of each of the data flows currently stored in the database;

a window value calculating sub-module (not shown in FIG. 5) configured to calculate the target window value of a receiving window for each of the data flows based on the bandwidth allocated for each of the data flows;

a flow table generating sub-module (not shown in FIG. 5) configured to, for each of the data flows, generate a target flow table for the data flow, and forward the target flow table to a target switch corresponding to the data flow, wherein a target flow table for any data flow is used to update the size of the receiving window of the data flow to the calculated target window value for the data flow.

As an implementation of the embodiment of the present invention, the second control module 540 may include:

a bandwidth allocating sub-module (not shown in FIG. 5) configured to allocate bandwidth for each of the data flows based on the link information and path information of the each of the data flows currently stored in the database;

a window value calculating sub-module (not shown in FIG. 5) configured to calculate the target window value of a receiving window for each of the data flows based on the bandwidth allocated for each of the data flows;

a flow table generating sub-module (not shown in FIG. 5) configured to, for each of the data flows, generate a target flow table for the data flow, and forward the target flow table to a target switch corresponding to the data flow, wherein a target flow table for any data flow is used to update the size of the receiving window of the data flow to the calculated target window value for the data flow.

As an implementation of the embodiment of the present invention, the bandwidth allocating sub-module (not shown in FIG. 5) may include:

an information statistics unit (not shown in FIG. 5) configured to obtain target link information of each target link in the topological structure through statistics based on the link information and the path information of each of the data flows, wherein the target link is a link including a data flow having not been allocated with bandwidth, and the target link information of any target link includes: an available bandwidth of the target link and the number of data flows flowing through the target link and having not been allocated with bandwidth;

a link determining unit (not shown in FIG. 5) configured to determine among the target links, the most congested target link as a to-be-allocated link based on the target link information of each target link;

a bandwidth allocating unit (not shown in FIG. 5) configured to allocate an available bandwidth of the to-be-allocated link for a to-be-allocated data flow of the to-be-allocated link, wherein the to-be-allocated data flow is a data flow flowing through the to-be-allocated link and having not been allocated with bandwidth;

an information updating unit (not shown in FIG. 5) configured to update link information of the link through which the to-be-allocated data flow flows, return to the information statistics unit until there is no target link in the topological structure.

As an implementation of the embodiment of the present invention, the link determining unit (not shown in FIG. 5) may include:

a congestion degree calculating subunit (not shown in FIG. 5) configured to, for each target link, calculate a ratio of the available bandwidth of the target link to the number of data flows flowing through the target link and having not been allocated with bandwidth, as a link congestion degree;

a link determining subunit (not shown in FIG. 5) configured to determine a target link with the minimum link congestion degree as a to-be-allocated link.

As an implementation of the embodiment of the present invention, the window value calculating sub-module (not shown in FIG. 5) is specifically configured to:

calculate the target window value of the receiving window for each of the data flows with the following formula:

$$\min \sum_{i \in F_{bottle}} rwnd_i / num_i^{bottleneck}$$

$$\text{s.t.} \sum_{i \in F_{bottle}} rwnd_i / num_i^{bottleneck} \geq window_{base}$$

$$\frac{rwnd_i}{b_i \times num_i^{bottleneck}} = \text{latency}, \forall i < m$$

$$rwnd_i \geq 2, \forall i < m$$

$$rwnd_i = b_i \times num_i^{bottleneck} \times \text{latency}$$

wherein $F_{bottle}$ represents a set of data flows flowing through a bottleneck link in a direction, the bottleneck link is a link whose bandwidth capacity is completely allocated in one direction or two directions, i represents a serial number of a data flow in a set $F_{bottle}$, $rwnd_i$ represents a target window value of the data flow numbered i, $num_i^{bottleneck}$ represents the number of bottleneck links through which the data flow numbered i flows, $window_{base}$ represents the size of a basic window that can satisfy the bandwidth capacity of the link, $b_i$ represents bandwidth allocated for the data flow numbered i, latency represents a latency of the bottleneck link, and m represents the number of data flows in the set $F_{bottle}$.

As an implementation of the embodiment of the present invention, the target switch is: a network edge switch; the above target flow table is a two-level flow table, wherein the first level is used to update the size of the receiving window of the data flow to the calculated target window value for the data flow, and the second level is used for routing.

Figure 6:
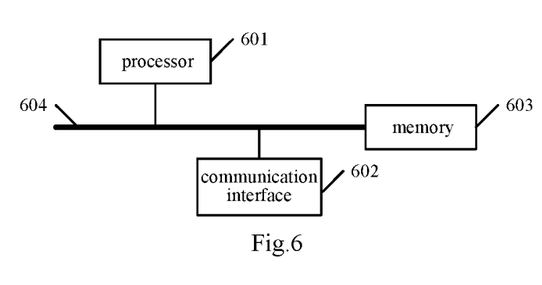
FIG. 6 is a structural schematic diagram of an SDN controller according to an embodiment of the present invention.

Corresponding to the congestion control method based on a software defined network SDN according to the embodiment of the present invention, an embodiment of the present invention further provides an SDN controller. As shown in FIG. 6, the SDN controller comprises a processor 601, a communication interface 602, a memory 603 and a communication bus 604, wherein the processor 601, the communication interface 602 and the memory 603 complete intercommunication through the communication bus 604, the memory 603 is configured to store a computer program;

the processor 601 is configured to, upon executing the program stored on the memory 603, perform the congestion control method based on a software defined network SDN according to the embodiment of the present invention.

The communication bus mentioned by the SDN controller may be a Peripheral Component (PCI) bus or an Extended Industry Standard Component (EISA) bus or the like. The bus may include an address bus, data bus, control bus and so on. For ease of illustration, the bus is represented with only one thick line in the figure, but this does not mean that there is only one bus or one type of buses.

The communication interface is used for communication between the SDN controller and other devices.

The memory may include a Random Access Memory (RAM), or a Non-volatile Memory (NVM), for example at least one magnetic disk memory. Optionally, the memory may also be at least one storage device located away from the processor.

The processor may be a general processor, including a Central Processing Unit (CPU), a Network Processor (NP) and the like; or may be a Digital Signal Processor (DSP), Application-Specific Integrated Circuit (ASIC), Field Programmable Gate Array (FPGA) or other programmable logical devices, discrete gates or transistor logical devices, discrete hardware components.

Corresponding to the congestion control method based on a software defined network SDN according to the embodiment of the present invention, an embodiment of the present invention further provides a computer readable storage medium which is a storage medium in a server and stores a computer program, the computer program is configured to, when being executed by the processor, perform steps of the congestion control method based on a software defined network SDN according to the embodiment of the present invention.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, embodiment of the device, SDN controller, computer readable storage medium are described briefly, since they are substantially similar to the embodiment of the method, and the related contents can refer to the description of the embodiment of the method.

The embodiments described above are simply preferable embodiments of the present invention, and are not intended to limit the scope of protection of the present invention. Any modifications, alternatives, improvements, or the like within the spirit and principle of the present invention shall be included within the scope of protection of the present invention.

What is claimed is:

1. A congestion control method based on a software defined network (SDN), which is applicable to an SDN controller, comprising:
   obtaining a packet_in message sent by a switch;
   determining a data packet included in the packet_in message;
   performing a first congestion control processing for a network where the SDN controller is located based on a topological structure and link information of the network when the data packet is a handshake information SYN packet for requesting to establish a new transmission control protocol (TCP) connection;
   performing a second congestion control processing for the network based on the link information when the data packet is a first FIN packet for responding to disconnection of an established TCP connection corresponding to the packet_in message in the network;
   deleting information of the established TCP connection stored in a database and corresponding to the data packet when the data packet is a second FIN packet for requesting to disconnect the established TCP connection corresponding to the packet in message in the network, wherein the database is used to store information of the new and the established TCP connections;
   wherein the performing a first congestion control processing for a network where the SDN controller is located based on a topological structure and link information of the network when the data packet is a handshake information SYN packet for requesting to establish the new TCP connection, comprises:
      extracting information of both communication parties from the SYN packet, wherein the information of both communication parties includes: an IP address of a sender, a port address of the sender, an IP address of a receiver and a port address of the receiver;
      determining path information of data flows between the sender and the receiver based on the topological structure and target information, wherein the target information includes: an ID of the switch, a input port number of the switch and the information of both communication parties;
      storing the target information and the path information of the data flows into the database;
      allocating bandwidth for each of the data flows based on the link information and the path information of each of the data flows currently stored in the database;
      calculating a target window value of a receiving window for each of the data flows based on the bandwidth allocated for each of the data flows;
      for each of the data flows, generating a target flow table for the data flow, and forwarding the target flow table to a target switch corresponding to the data flow, wherein the target flow table for the data flow is used to update a size of the receiving window of the data flow to the calculated target window value for the data flow;
      wherein the allocating bandwidth for each of the data flows based on the link information and path information of each of the data flows currently stored in the database, comprises:
         obtaining target link information of each target link in the topological structure through statistics based on the link information and the path information of each of the data flows, wherein the target link is a link of a data flow having not been allocated with bandwidth, and the target link information of each target link includes: an available bandwidth of the target link and the number of data flows flowing through the target link and having not been allocated with bandwidth;
         determining among the target links, a most congested target link as a to-be-allocated link based on the target link information of each target link;
         allocating available bandwidth of the to-be-allocated link for a to-be-allocated data flow of the to-be-allocated link, wherein the to-be-allocated data flow is a data flow flowing through the to-be-allocated link and having not been allocated with bandwidth;
         updating link information of a link through which the to-be-allocated data flow flows, and returning to the step of obtaining target link information of each target link in the topological structure through statistics based on the link information and the path information of each of the data flows, until there is no target link in the topological structure.

2. The method according to claim 1, wherein the performing a second congestion control processing for the network based on the link information when the data packet is the first FIN packet for responding to disconnection of the established TCP connection, comprises:
   allocating another bandwidth for each of the data flows based on the link information and another path information of each of the data flows currently stored in the database:
   calculating another target window value of another receiving window for each of the data flows based on the another bandwidth allocated for each of the data flows;
   for each of the data flows, generating the another target flow table for the data flow, and forwarding the another target flow table to another target switch corresponding to the data flow, wherein the target flow table for the data flow is used to update the size of the another receiving window of the data flow to the calculated another target window value for the data flow.

3. The method according to claim 2, wherein the allocating another bandwidth for each of the data flows based on the link information and another path information of each of the data flows currently stored in the database, comprises:
   obtaining another target link information of each target link in the topological structure through statistics based on the link information and the path information of each of the data flows, wherein the target link is a link of a data flow having not been allocated with bandwidth, and the another target link information of each target link includes: an available bandwidth of the target link and the number of data flows flowing through the target link and having not been allocated with bandwidth;

determining among the target links, another most congested target link as a to-be-allocated link based on the target link information of each target link;

allocating available bandwidth of the to-be-allocated link for a to-be-allocated data flow of the to-be-allocated link, wherein the to-be-allocated data flow is a data flow flowing through the to-be-allocated link and having not been allocated with bandwidth;

updating link information of a link through which the to-be-allocated data flow flows, and returning to the step of obtaining target link information of each target link in the topological structure through statistics based on the link information and the path information of each of the data flows, until there is no target link in the topological structure.

4. The method according to claim 1 wherein the determining among the target links, the most congested target link as the to-be-allocated link based on the target link information of each target link comprises:

for each target link, calculating a ratio of the available bandwidth of the target link to the number of data flows flowing through the target link and having not been allocated with bandwidth as a link congestion degree;

determining a target link with a minimum link congestion degree as the to-be-allocated link.

5. The method according to claim 3, wherein the determining among the target links, the another most congested target link as the another to-be-allocated link based on the another target link information of each target link comprises:

for each target link, calculating a ratio of the another available bandwidth of the target link to the number of data flows flowing through the target link and having not been allocated with bandwidth as another link congestion degree;

determining another target link with another minimum link congestion degree as the another to-be-allocated link.

6. The method according to claim 1, wherein calculating a target window value of a receiving window for each of the data flows comprises: calculating the target window value of a receiving window for each of the data flows with the following formula:

$$\min \sum_{i \in F_{bottle}} rwnd_i / num_i^{bottleneck}$$

$$\text{s.t.} \sum_{i \in F_{bottle}} rwnd_i / num_i^{bottleneck} \geq window_{base}$$

$$\frac{rwnd_i}{b_i \times num_i^{bottleneck}} = \text{latency}, \forall i < m$$

$$rwnd_i \geq 2, \forall i < m$$

$$rwnd_i = b_i \times num_i^{bottleneck} \times \text{latency}$$

wherein $F_{bottle}$ represents a set of data flows flowing through a bottleneck link in a direction, the bottleneck link is a link whose bandwidth capacity is completely allocated in one direction or two directions, i represents a serial number of a data flow in the set $F_{botte}$, $rwnd_i$ represents a target window value of the data flow numbered i, $num_i^{bottleneck}$ represents the number of bottleneck links through which the data flow numbered i flows, $window_{base}$ represents the size of a basic window that can satisfy the bandwidth capacity of the link, $b_i$ represents bandwidth allocated for the data flow numbered i, latency represents a latency of the bottleneck link, and m represents the number of data flows in the set $F_{botte}$.

7. The method according to claim 1, wherein the target switch is a network edge switch;

the target flow table is a two-level flow table, wherein a first level of the two-level flow table is used to update the size of the receiving window of the data flow to the calculated target window value for the data flow, and a second level of the two-level flow table is used for routing.

8. The method according to claim 2, wherein the another target switch is another network edge switch;

the another target flow table is another two-level flow table, wherein a first level of the another two-level table is used to update the size of the another receiving window of the data flow to the calculated another target window value for the data flow, and a second level of the another two-level table is used for routing.

9. A congestion control apparatus based on a software defined network (SDN), which is applicable to an SDN controller, comprising:

a message obtaining module configured to obtain a packet-in message sent by a switch;

a message determining module configured to determine a data packet included in the packet_in message, trigger a first control module when the data packet is a handshake information SYN packet for requesting to establish a new transmission control protocol (TCP) connection, trigger a second control module when the data packet is a first FIN packet for responding to disconnection of an established TCP connection corresponding to the packet in message in the network, and trigger a third control module when the data packet is a second FIN packet for requesting to disconnect the established TCP connection corresponding to the packet_in message in the network;

the first control module is configured to perform a first congestion control processing for the network where the SDN controller is located based on a topological structure and link information of the network;

the second control module is configured to perform a second congestion control processing for the network based on the link information;

the third control module is configured to delete information of the established TCP connection stored in a database and corresponding to the data packet, wherein the database is used to store information of the new and the established TCP connections;

the first control module is further configured for:

extracting information of both communication parties from the SYN packet, wherein the information of both communication parties includes: an IP address of a sender, a port address of the sender, an IP address of a receiver and a port address of the receiver;

determining path information of data flows between the sender and the receiver based on the topological structure and target information, wherein the target information includes: an ID of the switch, a input port number of the switch and information of both communication parties;

storing the target information and the path information of the data flows into the database;

allocating bandwidth for each of the data flows based on the link information and the path information of each of the data flows currently stored in the database;
calculating a target window value of a receiving window for each of the data flows based on the bandwidth allocated for each of the data flows;
for each of the data flows, generating a target flow table for the data flow, and forwarding the target flow table to a target switch corresponding to the data flow, wherein the target flow table for the data flow is used to update a size of the receiving window of the data flow to the calculated target window value for the data flow;
wherein the allocating bandwidth for each of the data flows based on the link information and path information of each of the data flows currently stored in the database, comprises:
obtaining target link information of each target link in the topological structure through statistics based on the link information and the path information of each of the data flows, wherein the target link is a link of a data flow having not been allocated with bandwidth, and the target link information of each target link includes: an available bandwidth of the target link and the number of data flows flowing through the target link and having not been allocated with bandwidth;
determining among the target links, a most congested target link as a to-be-allocated link based on the target link information of each target link;
allocating available bandwidth of the to-be-allocated link for a to-be-allocated data flow of the to-be-allocated link, wherein the to-be-allocated data flow is a data flow flowing through the to-be-allocated link and having not been allocated with bandwidth;
updating link information of a link through which the to-be-allocated data flow flows, and returning to the step of obtaining target link information of each target link in the topological structure through statistics based on the link information and the path information of each of the data flows, until there is no target link in the topological structure.

10. An SDN controller, comprising: a processor, a communication interface, a memory and a communication bus, wherein the processor, the communication interface and the memory communicate through the communication bus;
the memory is configured to store a computer program;
the processor is configured to, upon executing the program stored on the memory, perform of the method of claim 1 comprising:
obtaining a packet in message sent by a switch;
determining a data packet included in the packet-in message;
performing a first congestion control processing for a network where the SDN controller is located based on a topological structure and link information of the network when the data packet is a handshake information SYN packet for requesting to establish a new transmission control protocol (TCP) connection:
performing a second congestion control processing for the network based on the link information when the data packet is a first FIN packet for responding to disconnection of an established TCP connection corresponding to the packet in message in the network;
deleting information of the established TCP connection stored in a database and corresponding to the data packet when the data packet is a second FIN packet for requesting to disconnect the established TCP connection corresponding to the packet_in message in the network, wherein the database is used to store information of the new and the established TCP connections:
wherein the performing a first congestion control processing for a network where the SDN controller is located based on a topological structure and link information of the network when the data packet is a handshake information SYN packet for requesting to establish a new TCP connection, comprises:
extracting information of both communication parties from the SYN packet, wherein the information of both communication parties includes: an IP address of a sender, a port address of the sender, an IP address of a receiver and a port address of the receiver;
determining path information of data flows between the sender and the receiver based on the topological structure and target information, wherein the target information includes: an ID of the switch, a input port number of the switch and information of both communication parties;
storing the target information and the path information of the data flows into the database;
allocating bandwidth for each of the data flows based on the link information and the path information of each of the data flows currently stored in the database;
calculating a target window value of a receiving window for each of the data flows based on the bandwidth allocated for each of the data flows;
for each of the data flows, generating a target flow table for the data flow, and forwarding the target flow table to a target switch corresponding to the data flow, wherein the target flow table for the data flow is used to update a size of the receiving window of the data flow to the calculated target window value for the data flow;
wherein the allocating bandwidth for each of the data flows based on the link information and path information of each of the data flows currently stored in the database, comprises:
obtaining target link information of each target link in the topological structure through statistics based on the link information and the path information of each of the data flows, wherein the target link is a link of a data flow having not been allocated with bandwidth, and the target link information of each target link includes: an available bandwidth of the target link and the number of data flows flowing through the target link and having not been allocated with bandwidth;
determining among the target links, a most congested target link as a to-be-allocated link based on the target link information of each target link;
allocating available bandwidth of the to-be-allocated link for a to-be-allocated data flow of the to-be-allocated link, wherein the to-be-allocated data flow is a data flow flowing through the to-be-allocated link and having not been allocated with bandwidth;

updating link information of a link through which the to-be-allocated data flow flows, and returning to the step of obtaining target link information of each target link in the topological structure through statistics based on the link information and the path information of each of the data flows, until there is no target link in the topological structure.

11. A non-transitory storage medium, wherein a computer program is stored in the computer readable storage medium, and the computer program is configured to, when being executed by a processor, perform the method of claim 1 comprising:
 obtaining a packet in message sent by a switch;
 determining a data packet included in the packet-in message;
 performing a first congestion control processing for a network where the SDN controller is located based on a topological structure and link information of the network when the data packet is a handshake information SYN packet for requesting to establish a new transmission control protocol (TCP) connection;
 performing a second congestion control processing for the network based on the link information when the data packet is a first FIN packet for responding to disconnection of an established TCP connection corresponding to the packet_in message in the network;
 deleting information of the established TCP connection stored in a database and corresponding to the data packet when the data packet is a second FIN packet for requesting to disconnect the established TCP connection corresponding to the packet_in message in the network, wherein the database is used to store information of the new and the established TCP connections;
 wherein the performing a first congestion control processing for a network where the SDN controller is located based on a topological structure and link information of the network when the data packet is a handshake information SYN packet for requesting to establish a new TCP connection, comprises:
  extracting information of both communication parties from the SYN packet, wherein the information of both communication parties includes: an IP address of a sender, a port address of the sender, an IP address of a receiver and a port address of the receiver;
  determining path information of data flows between the sender and the receiver based on the topological structure and target information, wherein the target information includes: an ID of the switch, a input port number of the switch and information of both communication parties;
  storing the target information and the path information of the data flows into the database;
  allocating bandwidth for each of the data flows based on the link information and the path information of each of the data flows currently stored in the database;
  calculating a target window value of a receiving window for each of the data flows based on the bandwidth allocated for each of the data flows;
  for each of the data flows, generating a target flow table for the data flow, and forwarding the target flow table to a target switch corresponding to the data flow, wherein the target flow table for the data flow is used to update a size of the receiving window of the data flow to the calculated target window value for the data flow;
 wherein the allocating bandwidth for each of the data flows based on the link information and path information of each of the data flows currently stored in the database, comprises:
  obtaining target link information of each target link in the topological structure through statistics based on the link information and the path information of each of the data flows, wherein the target link is a link of a data flow having not been allocated with bandwidth, and the target link information of each target link includes: an available bandwidth of the target link and the number of data flows flowing through the target link and having not been allocated with bandwidth;
  determining among the target links, a most congested target link as a to-be-allocated link based on the target link information of each target link;
  allocating available bandwidth of the to-be-allocated link for a to-be-allocated data flow of the to-be-allocated link, wherein the to-be-allocated data flow is a data flow flowing through the to-be-allocated link and having not been allocated with bandwidth;
  updating link information of a link through which the to-be-allocated data flow flows, and returning to the step of obtaining target link information of each target link in the topological structure through statistics based on the link information and the path information of each of the data flows, until there is no target link in the topological structure.

* * * * *